United States Patent [19]

Nagashima

[11] Patent Number: 5,523,838
[45] Date of Patent: Jun. 4, 1996

[54] OPTICAL WAVEMETER EMPLOYING A LENGTH MEASURING MACHINE WITH A WHITE LIGHT SOURCE FOR ACHIEVING MAXIMUM INTERFERING EFFICIENCY

[75] Inventor: Shinya Nagashima, Tokyo, Japan

[73] Assignee: Ando Electric Co., Ltd., Tokyo, Japan

[21] Appl. No.: 401,165

[22] Filed: Mar. 9, 1995

[30] Foreign Application Priority Data

Mar. 31, 1994 [JP] Japan ................... 6-085636

[51] Int. Cl.$^6$ ................... G01B 9/02
[52] U.S. Cl. ................ 356/346; 356/358; 250/237 G
[58] Field of Search ................ 356/345, 346, 356/358; 250/237 G

[56] References Cited

U.S. PATENT DOCUMENTS

| | | | |
|---|---|---|---|
| 4,413,908 | 11/1983 | Abrams et al. | 356/346 |
| 4,444,501 | 4/1984 | Schwiesow | 356/346 |
| 5,110,211 | 5/1992 | Niki et al. | 356/346 |

*Primary Examiner*—Frank Gonzalez
*Assistant Examiner*—Robert Kim
*Attorney, Agent, or Firm*—Flynn, Thiel, Boutell & Tanis

[57] ABSTRACT

Each of beams originated from a light source to be measured and a white light source is branched by a beam splitter into two beams, which are reflected by a fixed and a movable mirrors respectively to meet each other again so as to generate interfering light, the white light being maximum in interfering efficiency when the optical path reaching the movable mirror is equal in length to that reaching the fixed mirror. The interfering light originated from the light source is converted into an electric signal by a first light receiver and further into pulses by a first converter. A length measuring machine outputs a pulse signal corresponding to the moving length of the movable mirror. A second light receiver converts the interfering light originated from the white light source into an electric signal. When it exceeds a set value, a second converter supplies an origin signal to the interfering light counting portion and the distance counting portion so that they start counting pulses and the position detecting portion outputs a position detecting signal when the movable mirror is moved for an arbitrary distance. A calculator calculates the wavelength of the light to be measured based on the counted values to display the result on a display. As a result, it is possible to provide an optical wavemeter which is increased in effective length of scale by permitting light originated from a white light source to be incident to an interferometer to find the position of the movable mirror where interfering efficiency is maximum and performing calibration as far as an arbitrary moving distance relative thereto.

1 Claim, 4 Drawing Sheets

OPTICAL WAVEMETER EMPLOYING A LENGTH MEASURING MACHINE WITH A WHITE LIGHT SOURCE FOR ACHIEVING MAXIMUM INTERFERING EFFICIENCY

BACKGROUND OF THE INVENTION

1. Field of the Invention

The present invention relates to an optical wavemeter employing a length measuring machine.

2. Description of the Related Art

FIG. 3 is a schematic diagram of an optical wavemeter of a prior art. In FIG. 3, denoted at 1 is a light source to be measured, 3 is a beam splitter, 4 is a fixed mirror, 5 is a movable mirror, 6 is a length measuring machine, 9 is a light receiver, 10 is a converter, 14 is a calculator, 15 is a display, 16 is a movable mirror driving portion, 17 is a linear moving mechanism, 21 is a position detecting portion, 22 is a distance counting portion and 23 is an interfering light counting portion.

The length measuring machine 6 illustrated in FIG. 3 comprises a scale 61 and a sensor 62. The movable mirror driving portion 16 comprises a motor portion 16A, pulleys 16B and 16C, a belt 16D and limit switches 16E and 16F. The belt 16D is made of, for example, a rubber belt.

A beam 1A having an unknown wavelength which is emitted by the light source 1 to be measured is branched by the beam splitter 3 into two beams, i.e., a passing beam 1B and a reflected beam 1C. The reflected beam 1C is further reflected by the fixed mirror 4, e.g., a corner-cube prism, and passes through the beam splitter 3 to be incident to the light receiver 9. Whereas the passing beam 1B is reflected by the movable mirror 5, e.g., the corner-cube prism and further by the beam splitter 3 to be incident to the light receiver 9.

At that time, the passing beam 1B and the reflected beam 1C which are incident to the light receiver 9 interfere with each other to form composite light 1D in the light receiver 9, which supplies an electric signal 9A corresponding to the strength of interfering light to the converter 10. The converter 10 converts the electric signal 9A from the light receiver 9 into pulses to supply the same to an interfering light counting portion 23.

The movable mirror 5 is fixed to the belt 16D stretched between the pulleys 16B and 16C of the movable mirror driving portion 16. When a motor rotates in the motor portion 16A, the pulley 16C which is fixed to the motor is rotated to move the movable mirror 5 fixed to the belt 16D on the linear moving mechanism 17 in the direction of an optical axis. As the movable mirror 5 moves in the direction of the optical axis, the electric signal 9A issued by the light receiver 9 becomes an electric signal which corresponds to the periodically repeating variation of light intensity due to interference. The wavelength of the electric signal 9A is the same as that of the beam 1A to be measured.

The length measuring machine 6 supplies a pulse signal 6A to the position detecting portion 21 and the distance counting portion 22 every time the movable mirror 5 moves by the distance resolution of the sensor 62. The sensor 62 supplies an origin signal 6B to the position detecting portion 21 when the movable mirror 5 passes the center of the scale 61.

The position detecting portion 21 counts the number of pulses in the pulse signal 6A being triggered by the origin signal 6B supplied from the sensor 62 of the length measuring machine 6 and when the movable mirror 5 moves by an arbitrary distance, that is, the number of pulses in the pulse signal 6A reaches an arbitrary number, the position detecting portion 21 outputs a position signal 21A to stop.

When the interfering light counting portion 23 receives the position signal 21A from the position detecting portion 21, it starts counting the number of pulses in a signal supplied by the converter 10 and stops counting when it receives the position signal 21A from the position detecting portion 21 again to output a counting result K to the calculator 14.

When the distance counting portion 22 receives the position signal 21A from the position detecting portion 21, it starts counting pulses in the pulse signal 6A from the sensor 62 of the length measuring machine 6 and when it receives the position signal 21A from the position detecting portion 21 again, stops counting to output a counting result N to the calculator 14.

The calculator 14 performs calculation by substituting the counting result N supplied thereto from the distance counting portion 22 in Equation: L=N×(resolution of the length measuring machine), wherein L is the moving distance of the movable mirror 5, and further substituting the moving distance L and the number of pulses K supplied thereto from the interfering light counting portion 23 in Equation: λ=2L/K to obtain π, i.e., the wavelength of the light to be measured so as to output the same to the display 15, which displays the wavelength data of the light to be measured thereon.

The motor portion 16A reverses the rotating direction of the motor therein when the movable mirror 5 contacts with either of the limit switches 16E and 16F. A plurality of data can be obtained by repeatedly moving the movable mirror and the wavelength can be measured more accurately by averaging the data.

FIG. 4 shows the configurations of the movable mirror 5 and the length measuring machine 6 in the optical wavemeter in FIG. 3. In FIG. 4, the movable mirror 5 can move horizontally on the linear moving mechanism 17. The moving distance of the movable mirror 5 is measured by the scale 61 and is detected by the sensor 62. The scale 61 is provided with an origin at the central portion of the scale 61.

In order to improve in measuring accuracy the optical wavemeter having a structure illustrated in FIG. 3, it is necessary to improve the measuring accuracy of the length measuring machine 6 and lengthen the measuring length. For this purpose, the length measuring machine 6 in FIG. 4 employs a scale 61 having an origin and light having a known wavelength such as frequency-stabilized laser is incident to the optical wavemeter for distance calibration between the origin of the scale 61 of the length measuring machine 6 and an arbitrary moving limit of the movable mirror 5.

However, in FIG. 4 for example, the distance calibration of the scale 61 can be performed only in either of a range between A and the center thereof and that between B and the center thereof though the scale 61 is effective for measurement in a range between A and B about the origin thereof. As a result, effective calibration range is reduced to a half of full scale so as to reduce the accuracy of the wavemeter.

Although it is possible to make the measuring distance large by moving the movable mirror 5 from the origin of the scale 61 to A in advance and then performing measurement between A and B after performing calibration between A and the origin of the scale 61 and between B and the origin of the scale 61, the movable mirror 5 is moved by the motor in the motor portion 16A by way of the belt 16D of the movable mirror driving portion 16 as illustrated in FIG. 3, so that when the movable mirror 5 moves from the center of the scale 61 to A and stops there, the movable mirror 5 does not always stop at the same position due to the inertia of the motor in the motor portion 16A or the elasticity of the belt 16D and consequently the calibration is not valid for correct measurement of wavelength.

SUMMARY OF THE INVENTION

It is an object of the present invention to provide an optical wavemeter of high accuracy by permitting light emitted from a white light source to be incident to an interferometer, the light being maximum in interfering efficiency when the movable mirror is located at a position where the optical path reaching the movable mirror is equal in length to that reaching the fixed mirror and then performing calibration starting at a standard position of the movable mirror where the interfering efficiency is maximum so far as the movable mirror can be moved so as to extend the effective scale length for calibration.

In order to attain the above object, the present invention provides an optical wavemeter comprising a beam splitter 3 which branches a beam emitted from a light source I to be measured into two beams, a fixed mirror 4 for returning one of the beams branched by the beam splitter 3 to the same, a movable mirror 5 which returns the other beam branched by the beam splitter 3 to the same, a length measuring machine 6 which is equipped with a scale 61 and a sensor 62 and outputs a pulse signal 6A every time the movable mirror 5 is moved by the distance resolution of the sensor 62, a light receiver 9 which converts interfering light generated when the split beams meet each other again into an electric signal, a converter 10 which converts an analog signal supplied by the light receiver 9 into pulses, a position detecting portion 11 which counts the number of pulses in the pulse signal 6A and stops counting to output a position detecting signal 11A when it detects the movement of the movable mirror 5 for an arbitrary distance, an interfering light counting portion 13 for counting the number of pulses outputted from the converter 10, a distance counting portion 12 for counting the number of pulses outputted from the sensor 62 of the length measuring machine 6, a calculator 14 which calculates the wavelength of the light to be measured based on the number of pulses in the interfering light counted by the interfering light counting portion 13 and that counted by the distance counting portion 12 and a display 15 for displaying the value of the calculated wavelength supplied from the calculator 14 thereon, wherein the optical wavemeter further comprises a white light source 2 for emitting light which is maximum in interfering efficiency when the movable mirror is located at a position where the optical path reaching the movable mirror is equal in length to that reaching the fixed mirror, a light receiver 7 which converts the interfering light originated from the white light source 2 into an electric signal and a converter 8 which outputs an origin signal 8A to the position detecting portion 11, the distance counting portion 12 and the interfering light counting portion 13 when the interference signal supplied from the light receiver 7 exceeds a set value.

DESCRIPTION OF THE PREFERRED EMBODIMENT

Figure 1:
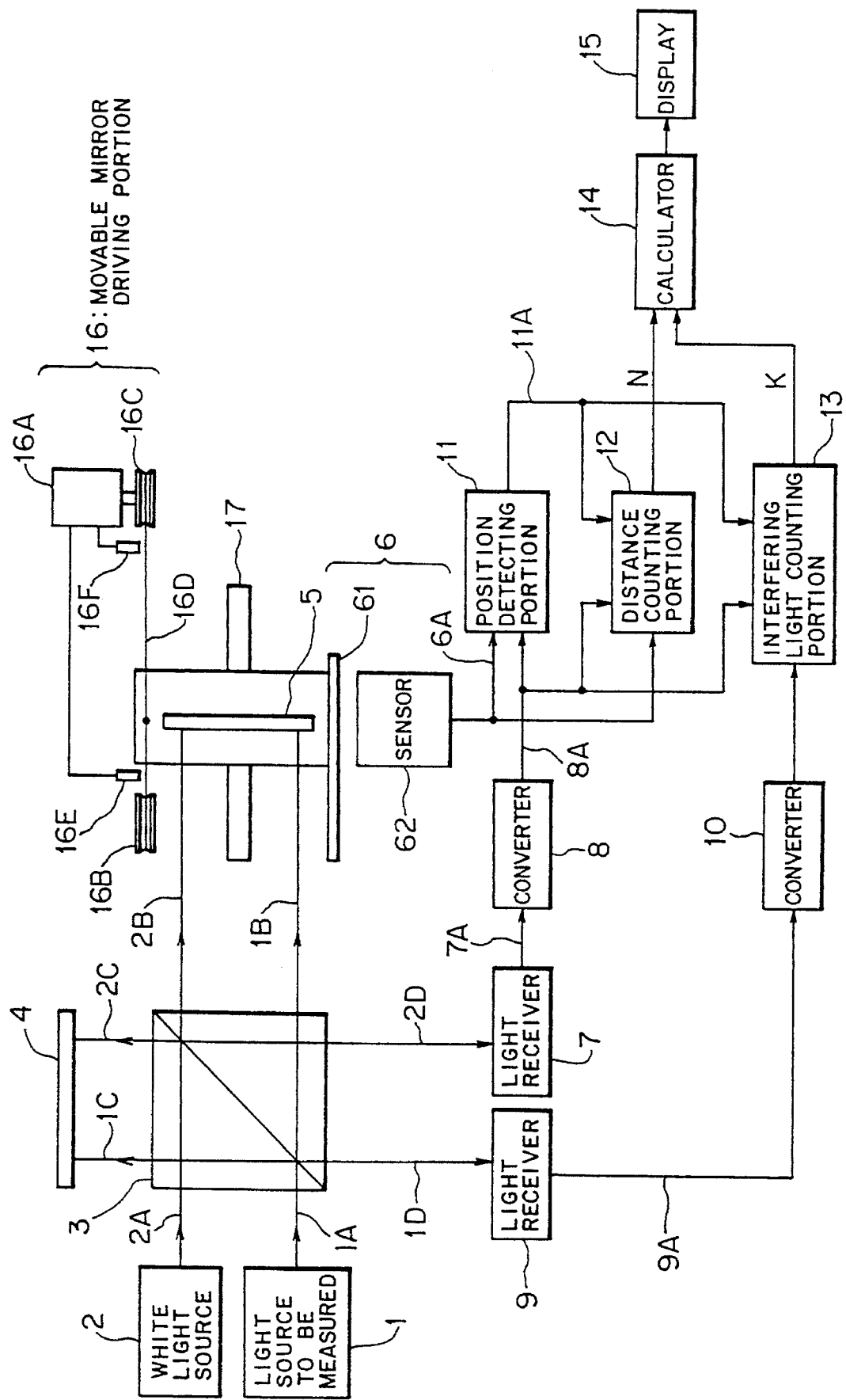
FIG. 1 is a block diagram of an optical wavemeter according to the present invention.

FIG. 1 shows the structure of the optical wavemeter according to the present invention. In FIG. 1, denoted at 2 is a white light source, 7 is a light receiver, 8 is a converter, 11 is a position detecting portion, 12 is a distance counting portion, 13 is an interfering light counting portion and the other components are the same as those in FIG. 3. That is, the optical wavemeter in FIG. 1 is constituted by adding the white light source 2, the light receiver 7 and the converter 8 to that in FIG. 3 and substituting the position detecting portion 21, the distance counting portion 22 and the interfering light counting portion 23 in the latter with the position detecting portion 11, the distance counting portion 12 and the interfering light counting portion 13.

In FIG. 1, a beam 1A of an unknown wavelength emitted by the light source I to be measured is branched into a passing beam 1B and a reflected beam 1C by a beam splitter 3, of which the reflected beam 1C is reflected by the fixed mirror 4 and passes through the beam splitter 3 to be incident to the light receiver 9, while the passing beam 1B is reflected by the movable mirror 5 and further by the beam splitter 3 to be incident to the light receiver 9. At that time, the reflected beam 1C interferes with the passing beam 1B when they are incident to the light receiver 9, so that the light receiver 9 to which the composite light 1D is incident supplies an electric signal 9A corresponding to the strength of the interfering light to the converter 10.

Figure 3:
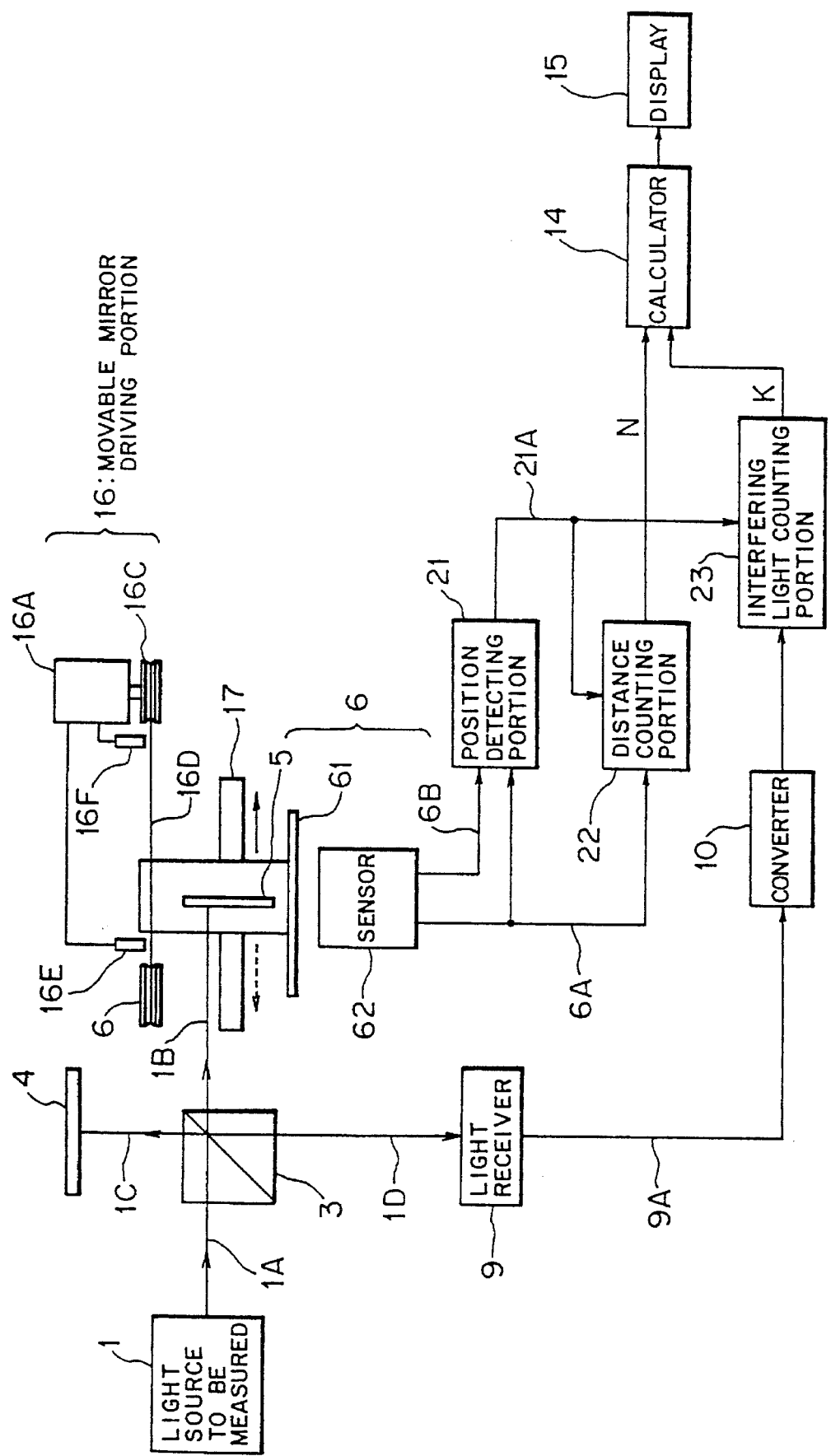
FIG. 3 is a block diagram of an optical wavemeter according to a prior art.
Figure 4:
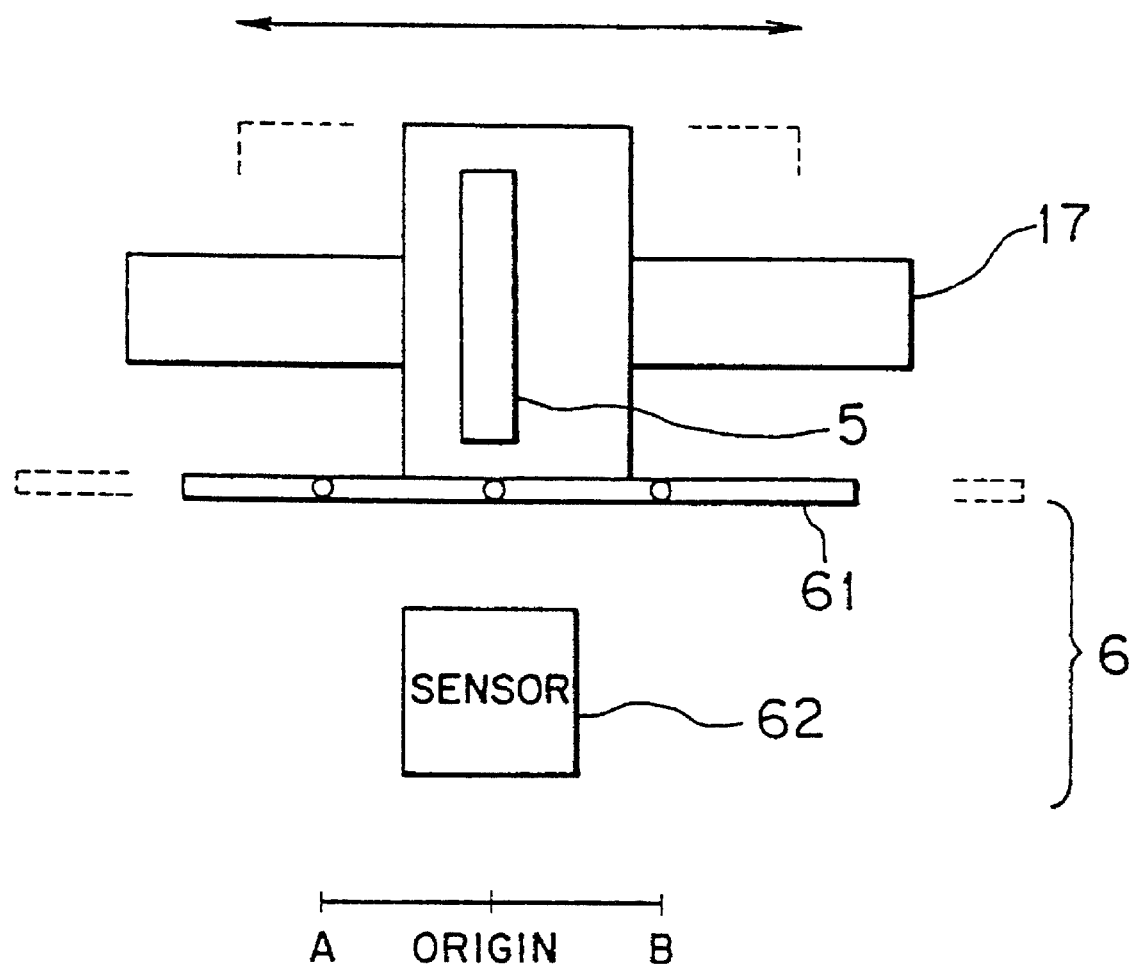
FIG. 4 is a view for explaining the distance calibration of a length measuring machine.

The movable mirror 5 is moved by the movable mirror driving portion 16 similarly in FIG. 3 and the light receiver 9 outputs the electric signal 9A. The converter 10 converts the electric signal 9A supplied thereto from the light receiver 9 into pulses to supply the same to the interfering light counting portion 13.

The white beam 2A which is emitted from the white light source 2 is branched into two beams, i.e., a reflected beam 2C and a passing beam 2B. The reflected beam 2C is reflected by the fixed mirror 4 and passes through the beam splitter 3 to be incident to the light receiver 7, while the passing beam 2B is reflected by the movable mirror 5 and further by the beam splitter 3 to be incident to the light receiver 7.

The light receiver 7 converts composite light 2D formed by superposing the reflected beam 2C and the passing beam 2B on each other into an electric signal 7A to supply the same to the converter 8. The converter 8 converts the electric signal 7A into a pulsating origin signal 8A at the time of its highest level.

Figure 2:
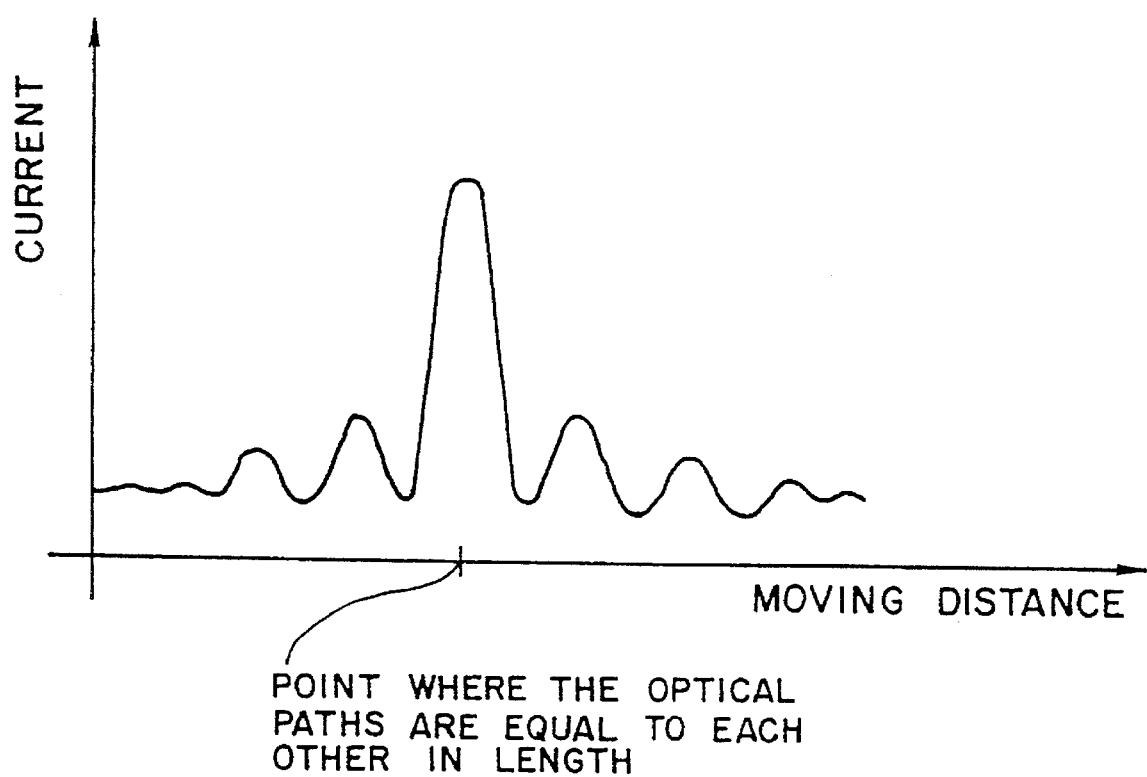
FIG. 2 is a waveform diagram of interfering light originated from a white light source in FIG. 1.

Hereupon, the electric signal 7A will be described with reference to FIG. 2. FIG. 2 is an interfering signal waveform diagram of the white light, wherein the axis of ordinate indicates current while the axis of abscissa indicates the moving distance of the movable stage. The electric signal 7A becomes an electric signal which corresponds to the periodical strength variation of light caused by interference. White light is so short in coherent distance that it generates interference then the difference in length between optical path of the reflected beam 2C and that of the passing beam 2B is small and the interfering efficiency becomes maximum when the they are equal to each other. Accordingly, it is possible to detect the position of the movable mirror where the optical paths are the same in length by setting the threshold value of the converter 8 to a value at which the interfering efficiency is maximum.

The length measuring machine 6 composed of the scale 61 and the sensor 62 outputs the pulse signal 6A to the position detecting portion 11 and the distance counting portion 12 every time the movable mirror 5 is moved by the distance resolution of the sensor 62. The position detecting portion 11 is triggered by the origin signal 8A to count the number of pulses in the pulse signal 6A and stops counting to output a position signal 31 to the linear moving mechanism 17 and a distance counting portion 12 when the movable mirror 5 is moved by an arbitrary distance, i.e., the number of pulses in the pulse signal 6A reaches an arbitrary number.

The interfering light counting portion 13 starts to count the number of pulses in a signal from the converter 10 when it receives the origin signal 8A from the converter 8 and stops counting when it receives the position detecting signal 11A from the position detecting portion 11 to output the counting result K to the calculator 14. The distance counting portion 12 starts counting the pulse signal 6A from the sensor 62 of the length measuring machine 6 when it receives the origin signal 8A from the converter 8 and stops counting when it receives the position detecting signal 11A from the position detecting portion 11 to output the counting result N to the calculator 14.

The calculator 14 performs calculation by substituting the counting result N from the distance counting portion 12 in Equation L=N× (resolution of the length measuring machine), wherein L is the moving distance of the fixed mirror 4, and further performs calculation by substituting the moving distance L and the number of pulses in the interfering light from the interfering light counting portion 13 in Equation $\lambda=2L/K$, wherein $\lambda$ is the wavelength of light to be measured, to output the wavelength data of the light to be measured to a display 20, which displays the wavelength data of the light to be measured supplied by the calculating portion 14.

According to the present invention, the white light, which is maximum in interfering efficiency when the movable mirror is located at a position where the optical path reaching the movable mirror is equal in length to that reaching the fixed mirror, is incident to an interferometer and distance calibration is performed relative to the position of the movable mirror where the interfering efficiency is maximum so that it is possible to set an origin in a scale of a length measuring machine which is equipped with no origin to provide a long moving range of the movable mirror for measuring a wavelength of light with accuracy.

What is claimed is:

1. An optical wavemeter employing a length measuring machine comprising:

a beam splitter which branches a beam emitted from a light source to be measured into two beams;

a fixed mirror for returning one of said beams branched by said beam splitter to the same;

a movable mirror which returns the other said beam branched by said beam splitter to the same;

said length measuring machine is equipped with a scale and a sensor and outputs a pulse signal every time said movable mirror is moved by a distance resolution of said sensor;

a first light receiver which converts interfering light generated when said beams meet each other again into an electric signal;

a first converter which converts an analog signal supplied by said first light receiver into pulses;

a position detecting portion which counts a number of pulses in said pulse signal output by said length measuring machine and stops counting to output a position detecting signal when said position detecting portion detects a movement of said movable mirror for an arbitrary distance;

an interfering light counting portion for counting a number of said pulses outputted from said first converter;

a distance counting portion for counting a number of pulses in said pulse signal outputted from said sensor of said length measuring machine;

a calculator which calculates a wavelength of light from said light source to be measured based on said number of pulses counted by said interfering light counting portion and said number of pulses counted by said distance counting portion;

a display for displaying a value of said wavelength calculated by said calculator;

a white light source for emitting light which is maximum in interfering efficiency when said movable mirror is located at a position where an optical path reaching said movable mirror is equal in length to that reaching said fixed mirror;

a second light receiver which converts a second interfering light originated from said white light source into an interference electric signal; and a second converter which outputs an origin signal to said position detecting portion, said distance counting portion and said interfering light counting portion when said interference electric signal supplied from said second light receiver exceeds a set value.

* * * * *